US011891277B2

(12) United States Patent
Dold et al.

(10) Patent No.: US 11,891,277 B2
(45) Date of Patent: Feb. 6, 2024

(54) ELEVATOR SYSTEM COMPRISING A PLURALITY OF DIFFERING SUPPORT MEANS

(71) Applicant: Inventio AG, Hergiswil (CH)

(72) Inventors: Florian Dold, Cham (CH); Andreas Egger, Kriens (CH); Marcus Junig, Oberkirch LU (CH); Daniel Meierhans, Sins (CH); Philipp Müller, Sempach (CH); Adrian Steiner, Inwil (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/757,254

(22) PCT Filed: Dec. 18, 2020

(86) PCT No.: PCT/EP2020/087226
§ 371 (c)(1),
(2) Date: Jun. 13, 2022

(87) PCT Pub. No.: WO2021/123310
PCT Pub. Date: Jun. 24, 2021

(65) Prior Publication Data
US 2023/0002193 A1 Jan. 5, 2023

(30) Foreign Application Priority Data
Dec. 20, 2019 (EP) .................................... 19218554

(51) Int. Cl.
*B66B 7/06* (2006.01)
*B66B 11/00* (2006.01)

(52) U.S. Cl.
CPC .............. *B66B 7/06* (2013.01); *B66B 11/008* (2013.01)

(58) Field of Classification Search
CPC ........ B66B 7/06; B66B 11/008; B66B 11/009
See application file for complete search history.

(56) References Cited

U.S. PATENT DOCUMENTS 568,567 A * 9/1896 Herdman .............. B66B 11/009 187/254
735,093 A * 8/1903 Greenwald ............. B66B 17/12 187/404
1,016,691 A * 2/1912 Ihlder ................... B66B 11/008 187/256
1,132,769 A 3/1915 Gale, Sr.
11,591,188 B2 * 2/2023 Watson ................... B66B 11/08
2006/0272846 A1 12/2006 Weinberger
2013/0126275 A1 * 5/2013 Shilpiekandula ......... B66B 7/06 187/254

(Continued)

FOREIGN PATENT DOCUMENTS

CN 104760870 A * 7/2015
CN 207792432 U * 8/2018
EP 1325881 A1 7/2003

(Continued)

*Primary Examiner* — Diem M Tran
(74) *Attorney, Agent, or Firm* — William J. Clemens; Shumaker, Loop & Kendrick, LLP

(57) ABSTRACT

An elevator system includes at least one car and at least one counterweight. At least two support means having different physical properties are arranged between the at least one car and the at least one counterweight.

9 Claims, 1 Drawing Sheet

(56) References Cited

U.S. PATENT DOCUMENTS

| | | | | |
|---|---|---|---|---|
| 2014/0353089 A1* | 12/2014 | Shani | | B66B 9/00 |
| | | | | 187/254 |

FOREIGN PATENT DOCUMENTS

| | | | |
|---|---|---|---|
| EP | 2072447 A1 | 6/2009 | |
| EP | 3099854 B1 | 8/2019 | |
| WO | WO-2018042568 A1 * | 3/2018 | |

* cited by examiner

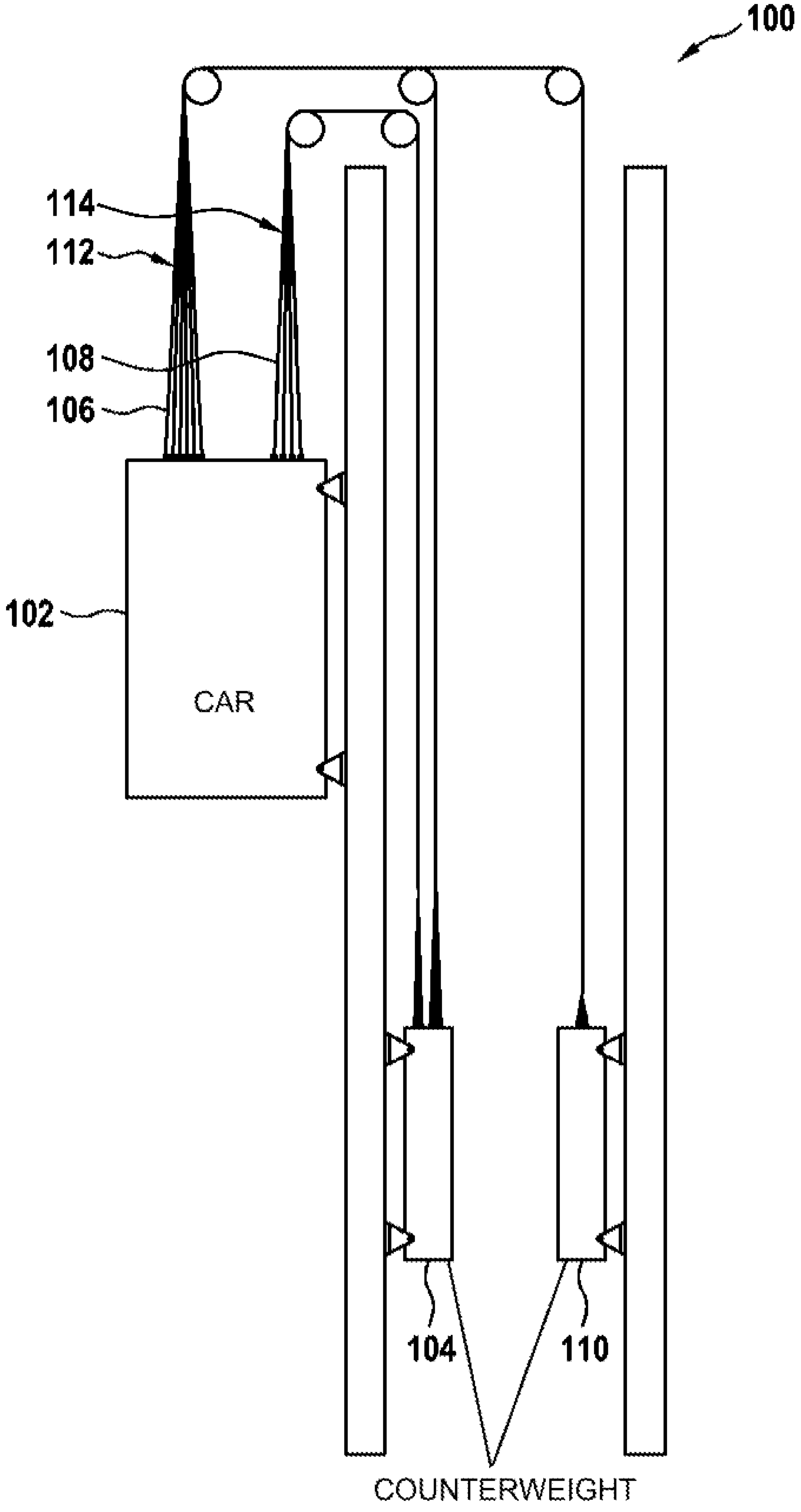
100
114
112
108
106
102
CAR
104
110
COUNTERWEIGHT

ELEVATOR SYSTEM COMPRISING A PLURALITY OF DIFFERING SUPPORT MEANS

FIELD

The present invention relates to an elevator system and, in particular, to an elevator support means.

BACKGROUND

A car of an elevator system and its counterweight are connected to support means. A support means can in this case be elongate and bendable transversely to its longitudinal direction. For example, a support means can be a cable, a belt, a strap or the like. Each support means can have a large number of support lines. For example, a cable-like support means can be composed of multiple support lines in the form of strands, usually steel strands. A belt-like support means can have multiple support lines, which are accommodated in a matrix material.

On the one hand, the support means can be designed to hold the weight of the car and the counterweight. On the other hand, the support means can be displaced by traction with a traction sheave driven by a drive machine in order to be able to displace the car and the counterweight along travel paths. The support means can therefore also be referred to as support traction means.

The support means can all be of the same type and have the same physical properties. The costs of the elevator system can be optimized by using the same support means, since simple material procurement and storage is possible. Furthermore, the same support means have substantially identical service lives, which means that any necessary maintenance or replacement of the support means can be easily planned.

EP 3 099 854 B1 describes a cable assembly.

There may be a requirement for an improved elevator system, inter alia.

SUMMARY

A requirement of this kind can be met by an elevator system comprising at least one car according to the advantageous embodiments that are defined in the following description.

According to one aspect of the invention, an elevator system comprising at least one car is proposed, at least two support means having different physical properties being arranged between the car and at least one counterweight of the car.

Possible features and advantages of embodiments of the invention can be considered, inter alia and without limiting the invention, to be based upon the concepts and findings described below.

An elevator system can be a passenger transport system for transporting people. A rail system of the elevator system can be arranged in a vertical elevator shaft of a building. At least one car of the elevator system and at least one counterweight per car can be movably guided in the vertical direction by the rail system. Support means of the elevator system can extend substantially in parallel with the rail system. The support means can be deflected by 180° at an upper end of the rail system. The support means are designed to transfer a weight of the car and the counterweight to the rail system or the building. The support means can also be deflected at the car and/or the counterweight.

A support means can be a cable or a belt or strap. A cable can be made up of a plurality of strands. A strand can consist of a large number of filaments and/or wires. The strands can be laid in an opposite lay direction to the cable. A belt can have a plurality of strands or cords embedded next to one another. The strands or cords can be embedded in a matrix material of the belt. The belt or strap can be designed as a smooth belt. The belt or strap can alternatively be designed as a belt profiled on a surface, for example as a V-ribbed belt. The strands or cords can transfer the load acting on the support means in a longitudinal direction of the support means.

A physical property of a support means can reflect or influence various properties and/or functionalities of the support means. For example, a physical property of this kind can influence the vibration behavior of the individual support means. The physical property can also influence the carrying capacity of the individual support means. The physical property can influence a breaking mechanism or a failure mechanism of the individual support means. The physical property can also represent or influence an expansion behavior, a bending behavior, a weight, a material composition, a surface structure or other properties of the support means. In a broad sense, a physical property of a support means can also reflect or influence its chemical reactivity or other chemical properties. The physical properties of the various support means can differ significantly, i.e. for example by more than 10%, preferably more than 20%, more than 50% or even more than 100%, relative to one another.

The support means can be redundant with regard to a maximum load-carrying capacity to be carried in the elevator system. One of the support means alone can have a load-carrying capacity or load-bearing capacity that is sufficient to securely connect the car and the counterweight without the other support means and to hold the loads that occur during normal operation of the elevator system. If one of the support means fails, damage to the other support means can be prevented by the support means being arranged mechanically independently of one another, for example. The support means can be fastened separately to the car, for example. The support means can also each have a separate guide or deflection. The support means can be fastened separately to the counterweight.

One of the support means can have a larger safety reserve than the other support means. A safety reserve, such as the minimum that support means in an elevator system must have available, can be specified by safety standards or regulations such as the European standard EN81. A safety reserve can be represented by a safety factor. The safety factor can express how much the support means is oversized relative to an expected load. One of the support means can have a larger safety factor than the other support means. If one of the support means breaks or if there is a breakage in one of the support means, there is a very high probability that the support means having the smaller safety reserve will be affected. Since there is a very high probability that the other support means will not be affected, the car can be safely stopped and evacuated. The elevator system can thus be safely taken out of operation. Due to the given probability of failure, in particular the support means having the smaller safety reserve can be monitored for damage. The elevator system can be monitored in a targeted manner using the specified probability of damage.

The elevator system can have two counterweights. One of the support means can be connected to one counterweight. The other support means can be connected to the other counterweight. By doubling the counterweights, the support means can be spatially separated from one another. One counterweight can be arranged on a first side of the car. The other counterweight can be arranged on the other side of the car. Each of the counterweights can be connected to at least one support means on the roof of the car. The support means thus extend substantially in the vertical direction within an elevator shaft of the elevator system. The support means extend within the elevator shaft substantially in parallel with a rail system in order to guide the car and the counterweight in the vertical direction. In operation, the counterweights move in the opposite direction to the car. Each of the counterweights can possibly be held with at least two support means, it being possible for the support means to have different physical properties.

The support means can be part of different support means arrangements. One of the support means arrangements can have a larger number of support means than the other support means arrangement. The support means arrangements can be composed of a plurality of substantially parallel support means. In the case of support means in the form of cables, the support means arrangements can consist of a plurality of individual cables. The different physical properties can be adjusted by varying the number of individual cables. In the case of support means in the form of belts, the support means arrangements can have different numbers of belts. If the support means arrangements have the same safety factors, one support means arrangement can have a smaller number of support means, each having a larger individual load-bearing capacity, while the other support means arrangement can have a larger number of support means, each having a smaller individual load-bearing capacity.

One of the support means can have larger dimensions than the other support means. Cables can have different cable diameters. Belts can have different belt widths and/or belt thicknesses. Due to different dimensions, the support means can have different maximum bearing loads. Due to different dimensions, the support means can have different failure mechanisms. Due to different failure mechanisms, a simultaneous failure of both support means can be very unlikely.

The support means can have different vibration properties. The different vibration properties can be achieved through different inner structures. Due to the different inner structures, the support means can have different resonance frequencies. Due to the different inner structures, the support means can have different failure mechanisms.

For example, the support means can have a different number of strands for the same bearing load. The strands can have different rigidities. Furthermore, the strands may differ in their material, thickness, and/or other physical properties. As a result, the resonance frequency of one support means can be higher than the resonance frequency of the other support means.

Cables can have different lay directions. Excitation can take place at different excitation levels due to different lay directions. As a result, vibrations can absorb one another. In particular, cables can have different lay lengths. A different lay length leads, for example, to different excitation frequencies at the same rolling speed due to contact points between the cable and the roller, since the contact points are at different distances due to the different lay lengths. Due to vibration damping, the different excitation frequencies can lead to a smooth running of the car or a low noise level in the car. The car can thus be moved at high speeds.

Cables can also have different cores. A cable having a fiber core or a core element made of synthetic fibers can have a lower density than a cable having a conventional metal core or a metal core element. As a result, the resonance frequency of one cable can be higher than the resonance frequency of the other cable. The different resonance frequencies can prevent a build-up to a common resonant vibration.

The support means can consist of different materials or combinations of materials. Different materials or combinations of materials can lead to different chemical failure mechanisms.

For example, a material or a combination of materials can be damaged by an unexpected substance, while the other material or combination of materials is not attacked by the substance. The safety of the elevator system can be improved by different chemical failure mechanisms. Likewise, the different materials or different combinations of materials can lead to different vibration behavior of the support means. The different materials or combinations of materials can influence the density and/or the bending behavior of the support means and thus lead to different resonance frequencies. One support means can have strands or cords made of a metal material, for example, while the other support means has strands or cords made of another metal material or a fiber material, such as plastics material, glass, Kevlar or carbon.

The support means can have differently shaped cross-sectional areas or be designed as different support means types. The one support means can have at least one belt, for example. The other support means can have at least one cable. Belts and cables have fundamentally different failure mechanisms. This ensures that both support means never fail at the same time.

The support means can substantially have the same expansion properties. Despite different physical and/or chemical properties, the support means can be matched to one another in such a way that they have a substantially identical increase in length with the same load. In this way, a load on the support means can be compensated for.

It should be noted that some of the possible features and advantages of the invention are described herein with reference to different embodiments. A person skilled in the art will recognize that the features may be suitably combined, adapted or exchanged as appropriate in order to arrive at further embodiments of the invention.

Embodiments of the invention will be described below with reference to the accompanying drawing, with neither the drawing nor the description being intended to be interpreted as limiting the invention.

DESCRIPTION OF THE DRAWINGS

FIG. 1 is a representation of an elevator system according to an embodiment of the invention.

The drawing is merely schematic and is not to scale.

DETAILED DESCRIPTION

FIG. 1 is a highly schematized representation of an elevator system 100 according to an embodiment. The elevator system 100 has a car 102 and a counterweight 104 for the car 102. The car 102 and the counterweight 104 are connected to one another via a first support means 106 and at least a second support means 108. The support means 106, 108 have different physical properties.

In a conventional elevator system, a car can be suspended from a large number of standard steel cables. Together, the steel cables can have a safety factor of 12, for example.

Traditionally, steel cables of identical strength and performance are used to distribute the load and braking forces evenly. Since all cables are the same, all cables can be equally tensioned and together reach a breaking point.

In the approach presented here, an asymmetry is inserted into the system in a targeted and conceptual manner. For example, the safety factor on one side can be set significantly higher than on the other side to ensure that after an expected service life, the weaker side always reaches the breaking point before the stronger side.

The weaker side can in this case be defined as a predetermined breaking point and monitored using simple methods. For example, a break in a cable on the weaker side can be detected by contact with a slack cable. When the cable break is detected, a brake of the car can be activated and the elevator system can be stopped and deactivated.

Since the second side is designed to be much stronger than the weak side, it can be ruled out that the break in the weak side will also result in a break in the strong side. The elevator system can therefore be safely evacuated and taken out of operation pending repairs.

If the strong side also breaks after the weak side breaks while the elevator system is at a standstill, it is at least ensured that the car is empty.

Alternatively or additionally, the cables can have different failure mechanisms that cannot occur simultaneously. One side can break, but the elevator system can be safely moved to a safe position using the second side.

Another reason for using embodiments of the approach presented here is that excitation frequencies typically arise when using steel cables as support means due to the cable lay length. If these meet systems of the elevator system that are capable of vibrating in resonance, elevator users will experience joint excitation and acoustic annoyance and/or vibration annoyance. This can be counteracted by support means, in particular cables, having different physical properties. For example, cables having different numbers of strands can be used to avoid a common excitation frequency. The cable expansion modules and diameters of both cable types can advantageously be selected to be identical.

The support means 106, 108 extend substantially in the vertical direction within an elevator shaft of the elevator system 100. The support means 106, 108 extend within the elevator shaft substantially in parallel with a rail system in order to guide the car 102 and the counterweight 104 in the vertical direction. At an upper end of the elevator shaft, the support means 106, 108 are deflected by 180° in order to connect the car 102 and the counterweight 104 to one another. Thus, the car 102 and the counterweight 104 are each moved in opposite directions by the support means 106, 108.

The support means 106, 108 are redundant in terms of their load-bearing capacity. Each support means 106, 108 alone is designed to carry a weight of the car 102 with passengers and a weight of the counterweight 104 with a safety reserve. Should the first support means 106 become damaged, the second support means 108 can safely carry and move the car 102 and the counterweight 104. The support means 106, 108 are in this case guided via separate guide rollers. However, the support means 106, 108 can also be guided via common guide rollers in order to ensure synchronous movement of the support means 106, 108.

In one embodiment, the first support means 106 has a larger safety reserve than the second support means 108. For example, the first support means 106 has a safety factor of eight, while the second support means 108 has a safety factor of four. The safety factor expresses by how many times the relevant support means 106, 108 is oversized relative to a permissible maximum load of the elevator system 100. Together, the support means 106, 108 have a safety factor of 12. Due to the different safety factors, it is extremely unlikely that the first support means 106 will fail. In contrast, the second support means 108 has a significantly higher probability of failure due to the significantly lower safety factor of four. Therefore, if one of the support means 106, 108 should fail, there is a very high probability that it will be the second support means 108. In the embodiment shown here, the second support means 108 in particular can be monitored.

In one embodiment, the elevator system 100 has a second counterweight 110. The second counterweight 110 is connected to the first support means 106 here.

In one embodiment, the first support means 106 is part of a first support means arrangement 112. The first support means arrangement 112 has six support means 106. The second support means 108 is part of a second support means arrangement 114. The second support means arrangement 114 has four support means 108. The support means 106 of the first support means arrangement 112 all extend via common guide rollers. Likewise, the support means 108 of the second support means arrangement 114 extend together via common guide rollers. The support means arrangements 112, 114 can have the same carrying capacity despite a different number of support means 106, 108.

In one embodiment, the first support means 106 has a larger cross-sectional area than the second support means 108. If the support means 106, 108 are cables, the support means 106, 108 have different cable diameters. If the support means 106, 108 are belts, the support means 106, 108 have different belt widths. Due to the different dimensions, the support means 106, 108 can have different safety factors and different vibration properties. For example, the first support means 106 having the larger cross-sectional area can have a lower natural frequency than the second support means 108 having the smaller cross-sectional area.

Furthermore, the support means 106, 108 can have different failure mechanisms due to the different cross-sectional areas. For example, due to the smaller cross-sectional area, the second support means 108 can be more flexible than the first support means 106 having the larger cross-sectional area. Due to the greater flexibility, the second support means 108 can be less susceptible to fatigue breaks.

In one embodiment, both support means 106, 108 are cables. The first support means 106 has a first inner structure. The second support means 108 has a second inner structure. The inner structure can influence the vibration properties of the support means 106, 108. For example, the first support means 106 has nine strands as the inner structure of the cable, while the second support means 108 has eight strands as the inner structure. Both support means in this case have the same cable diameter and expansion properties.

Alternatively or additionally, the first support means 106 can have a shorter lay length than the second support means 108. The lay length refers in this case to a cable length in which a strand is laid completely around the cable or around the cable circumference in a helix-like manner. The different lay lengths result in contact points with the guide rollers that are spaced differently from one another. The different distances between the contact points lead to different excitation frequencies of the support means 106, 108 at the same movement speed. The resulting vibrations are transmitted by the support means 106, 108 to the car 102, where they are weakened by destructive interference due to the different excitation frequencies and can even cancel each other out.

In one embodiment, the support means 106, 108 have different materials or combinations of materials. For example, a core element of the first support means 106 can consist of a synthetic fiber material and thus have a lower density than a core element of the second support means 108 made of a metal material.

The first support means 106 can also have strands made of a lighter material than the strands of the second support means 108. Due to the different density, the support means 106, 108 have different weights per meter and thus different vibration properties. The lighter first support means 106 can have a higher natural frequency than the heavier second support means 108.

In addition, the different materials can lead to different corrosion properties. Due to the different corrosion properties, one of the support means 106, 108 can be insensitive to a substance, while the other support means 106, 108 is attacked by the substance. The different corrosion properties can lead to different failure mechanisms.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

a car;

two counterweights;

two support means having different physical properties, a first of the support means being connected between the car and one of the counterweights and a second of the support means being connected between the car and another of the counterweights; and wherein the first and second support means are redundant with regard to a maximum load-carrying capacity to be carried in the elevator system.

2. The elevator system according to claim 1 wherein the first support means has a larger safety reserve than the second support means.

3. The elevator system according to claim 1 wherein the first support means is part of a first support means arrangement and the second support means is part of a second support means arrangement, the first support means arrangement having a larger number of the first support means than a number of the second support means in the second support means arrangement.

4. The elevator system according to claim 1 wherein the first support means has larger dimensions than corresponding dimensions of the second support means, the dimensions being at least one of diameter, width and thickness.

5. The elevator system according to claim 4 wherein the first support means has a larger cross-sectional area than a cross-sectional area of the second support means.

6. The elevator system according to claim 1 wherein the first support means has different vibration properties than vibration properties of the second support means.

7. The elevator system according to claim 1 wherein the first support means includes different materials or combinations of materials than materials included in the second support means.

8. The elevator system according to claim 1 wherein the first support means has a cross-sectional area shaped differently than a cross-sectional area of the second support means.

9. The elevator system according to claim 1 wherein the first and second support means have a same expansion properties.

* * * * *